Aug. 2, 1966      W. B. CONRAD      3,263,519

FLEXIBLE CONDUIT WITH MOLDED END FITTING

Filed July 26, 1963

INVENTOR.
Winthrop B Conrad
BY
Barnard, McGlynn & Leising
ATTORNEYS

United States Patent Office 3,263,519
Patented August 2, 1966

3,263,519
FLEXIBLE CONDUIT WITH MOLDED
END FITTING
Winthrop Brown Conrad, Franklin, Mich., assignor to Teleflex Incorporated, North Wales, Pa., a corporation of Delaware
Filed July 26, 1963, Ser. No. 297,899
9 Claims. (Cl. 74—501)

The present invention relates to an improved, flexible conduit and method for making same. More specifically, the subject matter of this invention is an improved structure and method for manufacturing a flexible conduit of the type having an inner flexible tube surrounded by a plurality of wires helically wound about the tube on a long lead, these wires in turn being surrounded by a flexible protective casing. One of the chief utilities for such a conduit is in flexible controls wherein a core element is supported for movement, longitudinal, rotary or both, within the flexible tube for transmitting motion. The present invention is an improvement in that covered by United States patent application S.N. 297,900 filed concurrently herewith in the name of August E. Tschanz and assigned to the assignee of the present invention.

Flexible conduits of the type described are well known, as illustrated by U.S. Patent 3,063,303 granted to A. A. Cadwallader on November 13, 1962, and are commonly used, for example, as flexible controls in marine, aircraft and other automotive vehicles and the like. Such a conduit has the outstanding feature of providing good flexibility while accommodating relatively high tension, compression and radial loads thereby assuring against rupture and minimizing losses in motion transmitting efficiency. For optimum flexibility of such a conduit, commensurate with accommodating the high tensile, compression and radial loads, it is desirable that the helically wound wires be able to undergo a slight amount of slidable movement to and fro relative to each other and relative to the inner tube and the surrounding protective casing. For example, it has been found advantageous, as an assist in enabling such sliding movement, that there be a little space between the wires, albeit a full complement of wires is used to provide optimum strength. Further, it has been proposed to minimize the relatively high frictional contact between adjacent wires by interposing plastic between the wires so as to further enhance their ability to slide with respect to each other, reference here being made to U.S. patent applications S.N. 191,978 filed May 2, 1962 in the name of Donald R. Pierce, and now Patent No. 3,192,- 795, and S.N. 214,142 filed August 1, 1962 in the name of Donald R. Pierce, and now Patent No. 3,177,901. However, in all such flexible conduits, and particularly in those wherein specific provision is made to further enhance flexibility as alluded to above, there is a serious problem in that upon repeated flexing of the conduit, the wires tend to be worked toward and out of the ends of the conduit thereby destroying or at least stressing the end fittings. For this reason, it has heretofore been necessary to use conduit end fittings which, by reason of materials and manufacturing costs, are relatively expensive. Further, even those relatively expensive fittings have not been entirely satisfactory in providing a really good end anchor for the conduit without at the same time detracting from cable flexibility by interference with the ability of the wires to undergo slight movement with respect to each other and with respect to the inner tube and the protective casing. In the aforementioned United States Patent application of August E. Tschanz there is claimed a flexible conduit of the type described wherein the end fitting is of thermoplastic organic material and is formed and bonded to the conduit by injection molding thermoplastic resin against the end of the conduit. The present invention constitutes an improvement over the invention of August E. Tschanz particularly useful where an exceptionally strong connection between the conduit and the end fitting is desired.

Hence, it is an object of the present invention to provide a flexible conduit of the type described having an end fitting which is firmly secured to the conduit and yet without impairment to the strength, flexibility or other useful characteristics of the conduit.

Another object of the invention is the provision of an improved, relatively low cost method for manufacturing a flexible conduit and, more specifically, for securing a fitting to a conduit of the type described.

Briefly, these objects are accomplished in accordance with the invention by a plastic, i.e., an organic polymeric, fitting which is intimately bonded to the outer protective casing of the flexible conduit, the end portions of the protective casing, the sheath wires and the inner tube being flared outwardly, such flared ends being imbedded in the plastic fitting to provide a mechanical interlock and therefore an even stronger attachment between the fitting and the conduit. Hence, the fitting is fixably and durably secured to the conduit and yet without dependence on any radially inwardly directed pressure which would impair the ability of the helically wound wires underneath the protective covering to slide with respect to each other and with respect to the protective covering and the inner tube. The plastic fitting is formed to the conduit by molding the plastic to the desired shape against the conduit casing, after the end of the conduit has been flared, such that the fitting is both formed and intimately bonded to the conduit in such operation.

Other objects, features and advantages of the invention will appear more clearly from the following detailed description of preferred embodiments thereof made with reference to the accompanying drawings in which.

Figure 1:
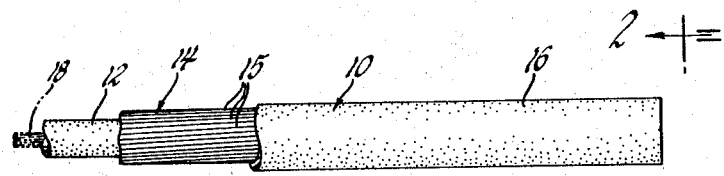
FIGURE 1 is a fragmentary side view, with parts cut away, of a flexible conduit of the type to which the invention relates.
Figure 2:
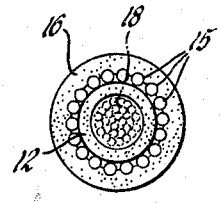
FIGURE 2 is a sectional view of the conduit taken on the line 2—2 of FIGURE 1, but in larger scale.

Referring now to the drawings wherein like members are identified by the same numerals, FIGURES 1 and 2 show a flexible conduit 10 comprising an inner tube member 12 overlaid with a sheath 14 formed by a plurality of wires 15 helically wrapped on a long lead about the inner tube member 12, this sheath 14 in turn being covered with a flexible casing 16. The assembly, as used, for a flexible control includes a movable core element 18 disposed within the inner tube member 12.

Tube member 12 may be formed in any desired manner and of a suitable material so as to insure its flexibility and, where used as a flexible control to provide a low-friction support to permit core element 18 to be freely slidably movable therewithin. While tubular member 12 may thus assume many forms, it is preferred that it be made of an extruded organic plastic material, highly desirable materials being the superpolyamide resins, commonly known as nylon, and polytetrafluoroethylene also known as Teflon. In those instances where the operating requirements are not too severe and where lower conduit costs are important, less expensive plastic materials such as polyethylene polypropylene, etc., may be used to advantage.

Any of the aforementioned organic plastics may also be used for the flexible casing 16 which, like tube member 12, is generally formed by extrusion. In addition, the various other plastics such as the polyvinyls, for example plasticized polyvinylchloride, may be used for the casing 16, the importance of low friction or lubricative properties being less important for the material of casing 16 than for the inner tube member 12. In general, the material and the wall thickness of the casing 16 should be such as to provide good flexibility commensurate with sufficient strength to accommodate, without rupture or permanent distortion, any radial loads imposed on it by the sheath 14 during conduit flexing.

In the particular embodiment shown in FIGURES 1 and 2, the sheath 14 is formed by a full complement of metal wires 18, there being room in the complement, however, for slight spacing between the wires. As alluded to previously, such slight spacing is advantageous in that it reduces frictional engagement between adjacent wires and hence imparts better flexing characteristics to the conduit. The wires can be either of unitary structure, i.e., monofilaments, or they can be in the form of a multiplicity of filaments twisted to form a strand. Further, the sheath of wires or the individual wires can be of composite structure, for example plastic and metal, as covered in the U.S. patent applications of Donald R. Pierce alluded to above. However, for optimum conduit strength, particularly tensile strength, it is desirable that at least some and preferably all of the wires comprise a high tensile strength metal such as steel. If desired, the capacity of the sheath to accommodate high radial loads can be further enhanced by helically winding a wire or fiber roving on a relatively short lead around the sheath 14; that is between the sheath and the casing 16, as shown in the aforementioned Cadwallader patent.

Figure 3:
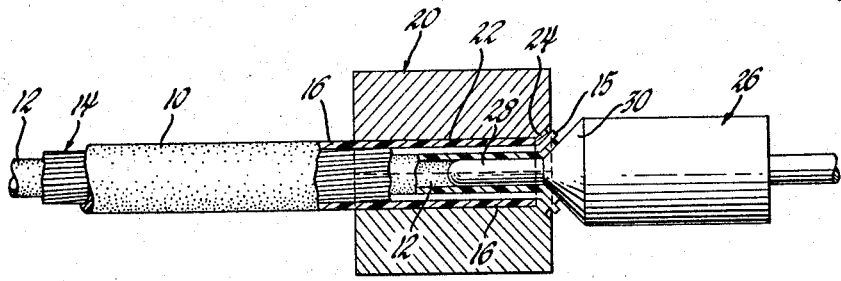
FIGURE 3 is a side view, partially in section and with parts broken away, of the conduit shown in FIGURE 1, but in the course of a processing operation, that of flaring the end of the conduit, in accordance with the invention.

Referring now to FIGURE 3, in accordance with the invention, the end of the conduit 10 (core element 18 not being included) is placed in a metal die 20 having a cylindrical bore 22 sized to snugly receive the conduit and terminating at one end with a flared or frusto-conical shaped surface 24. With the conduit so positioned, with its free end adjacent and concentric with the flared surface 24, a punch 26 is driven into the conduit as shown. The punch has a forward cylindrical portion 28 which slides snugly into the inner tube member 12, and a frusto-conical portion 30 which engages the end of the conduit and hence flares it outwardly against the surface 24. The pressure applied is sufficient to cause the plastic and wires at the end of the conduit to take a set and hence retain the flared shape when the punch 26 is withdrawn.

Figure 4:
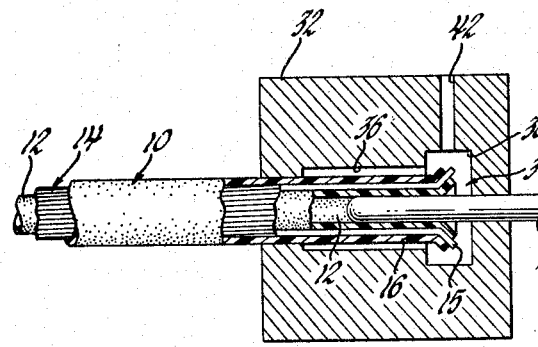
FIGURE 4 is a view similar to that in FIGURE 3, but illustrating a subsequent processing operation, that of molding the fitting, in accordance with the invention.
Figure 5:
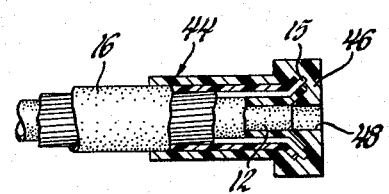
FIGURE 5 is a view, partially in section and with parts broken away, of a conduit embodying the invention and resulting from the processing operation illustrated in FIGURES 3 and 4.

And now with reference to FIGURE 4, as the next step in the process, the flared end of the conduit is positioned in a mold 32 having a cavity 34 which is of the shape of the desired fitting. In the FIGURE 4 embodiment, the mold cavity comprises an elongate cylindrical portion 36 which concentrically surrounds the end portion of the inserted conduit adjacent its flared end and communicating with a cyclindrical portion 38 of relatively large diameter which concentrically encloses the flared end. To complete the mold cavity, a pin 40 projects through the mold and wall into the inner tube member 12 of the conduit. With the conduit so positioned in the mold, a suitable thermoplastic is injected through opening 42 into the mold cavity under pressure sufficient to cause the plastic to completely fill the cavity. After the plastic is hardened, the split mold is opened, the pin withdrawn, and the finished conduit, as shown in FIGURE 5, removed. During this molding operation the fitting is not only molded to its desired shape but is also intimately bonded to the end portion of the conduit thereby providing a strong, durable attachment. As can be seen in FIGURE 5, the resulting fitting 44 has an inwardly extending annular flange 46, the inner surface 48 of which defines a bore which is aligned with that of the inner tube member 12. This annular flange abuts the ends of the wires 15 and hence assures against their being worked out of the assembly by reason of repeated flexing or otherwise. Because the fitting is of plastic and hence has some inherent resiliency, there is adequate accommodation for the slight amount of sheath wire movement that takes place when the conduit is flexed. The resiliency of the bonded connection and of the casing itself supplements that of the flange 46 in this regard. Hence, the plastic fitting and its bonded connection to the casing provide excellent conduit flexibility, optimum assurance against the sheath wires working out of the conduit, and all without any impairment to strength. The flared end of the conduit which is embedded in the plastic fitting provides a mechanical interlock which complements the bonded connection between the fitting and the conduit thereby adding further strength to the connection.

It is much preferred that the plastic used for the fitting be a thermoplastic and that operation be one of injection molding; however, it will be undersood that in its broader scope the invention comprehends the use of other types of molding operations and the use of thermosetting resins. Any of the well-known organic plastics may be used as the material for the fitting, for example, nylon, Teflon, the synthetic elastomers, the polyvinyls or, as is most advantageous, the polyalkylenes such as polyethylene, polypropylene or their copolymers. It will be obvious of course that the end of the conduit against which the fitting is molded should be free of grease and otherwise clean to assure a good bond. The temperature of the plastic casing is such that during molding there is some penetration or diffusion of the molded plastic into the plastic of the casing, and visa versa, thereby providing excellent fusion and hence an optimum bond between the fitting and the casing. In the particular embodiment shown, the casing was made of a polyethylene-butene copolymer (available on the market as Marlex No. 5003 from the Phillips Chemical Company of Bartlesville, Oklahoma) having a softening temperature of about 255° F.; this time a polyethylene copolymer was used as a material for the fitting and was injection molded at a temperature on the order of 400° F., an excellent durable bond resulting between the fitting and the casing.

Figure 6:
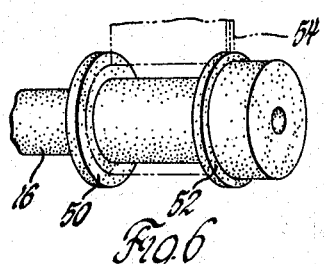
FIGURE 6 is a perspective view of a conduit with a modified conduit end fitting made in accordance with the invention.

FIGURE 6 shows a modified conduit end fitting, the same as that shown in FIGURE 5 except for the external shape. In the modification, the fitting is formed with spaced annular flanges 50 and 52 to serve as end barriers for attachment means in the form of a split annular metal clamp 54 used to secure the conduit to a support. If desired, the metal clamp 54 can be embedded in and bonded to the fitting during the molding operation, as covered on the aforementioned patent application of August E. Tschanz. That is, the clamp can be positioned in the mold into which the plastic is injected to form the fitting whereby the clamp is permanently bonded to the fitting during such operation. It will be manifest that numerous other external shapes can be made, all within the invention.

Even though the casing 16 may be quite thin, usually with a thickness less than 1/16", and generally no more than 1/32", the molded and bonded plastic fitting in combination with such casing and its associated wire sheath 14 with flared ends is amply strong to withstand high tensile and other loads. The method of this invention serves to excellent advantage not only because it provides a much improved product but because it is eminently suited to efficient manufacture on a low cost high production basis. Hence, the invention provides an improved conduit at a lower cost. While the conduit is particularly useful for flexible controls, it will be understood that it will also serve to advantage for various other uses. For example, because of the capacity of the conduit and its associated end fittings to take high radial and tensile loads, it is well suited for conducting pressurized liquid or gas as in high pressure hydraulic and pneumatic lines. Hence though the invention has been described specifically with reference to certain embodiments thereof, it will be understood that various changes and modifications may be made all within the full and intended scope of the claims which follow.

I claim:

1. A flexible motion-transmitting control assembly comprising a flexible conduit of organic polymeric material having an outer surface and an inner bore, and at least one wire extending helically on a long lead through said conduit between said outer surface and bore thereof and being movable relative to said conduit as the latter is flexed, an end of said wire projecting from an end of said conduit and being bent radially outwardly from the axis of the latter; a flexible motion-transmitting wire core element supported within and extending through said bore for movement relative to said conduit; an end fitting of organic polymeric material molded about said end of said conduit and said end of said wire so as to embed the latter therein to form a mechanical interlock therebetween to prevent relative axial movement between said fitting and said conduit as said core element is moved relative to the latter, said fitting and mechanical interlock maintaining said conduit substantially free of radial forces which would radially deform said conduit and said bore and interfere with movement of said wire and said core element relative thereto, axial loads imposed on said wire as said core element is moved within said conduit being transmitted therefrom to said fitting; and attachment means carried by said fitting and attachable to a fixed support structure to secure said end of said conduit thereto while said core element is moved relative to said conduit.

2. The control assembly as defined in claim 1 wherein said outer surface of said conduit and said fitting are of organic polymeric thermoplastic materials bonded to each other.

3. A flexible motion-transmitting control assembly comprising a flexible conduit including an inner tubular member of low friction organic polymeric material defining a bore of substantially uniform cross section throughout the length thereof, at least one axial load-bearing wire wrapped helically about said inner tubular member on a long lead and being movable relative to said inner tubular member as the latter is flexed, and a smooth tubular outer casing of organic polymeric material enclosing said wire and said inner tubular member, an end of said wire projecting from between said inner tubular member and said casing at an end of said conduit and being bent radially outwardly from the axis of the latter; a flexible motion-transmitting wire core element supported within and extending through said bore for movement relative to said conduit, movement of said core element within said bore imposing axial loads on said wire; and a fitting of organic polymeric material molded about said casing and said end of said wire, said end of said wire being embedded in said fitting to form a mechanical interlock therebetween to prevent relative axial movement between said fitting and said conduit as said core element is moved relative to the latter and to transmit axial loads imposed on said wire to said fitting, said fitting and mechanical interlock maintaining said conduit substantially free of radial forces which would radially deform said casing and the substantially uniform cross section of said bore and interfere with movement of said wire and said core element relative thereto.

4. The control assembly as defined in claim 3 wherein said materials of said casing and said fitting are thermoplastic, said materials being diffused into each other to form a fused bond therebetween.

5. The control assembly as defined in claim 3 wherein said fitting includes an annular flange extending radially inwardly over said end of said conduit and defining an opening substantially axially aligned with said bore, said core element extending through and being movably supported within said opening.

6. The control assembly as defined in claim 3 further comprising attachment means carried by said fitting and attachable to a fixed support structure to secure said end of said conduit thereto while said core element is moved relative to said conduit.

7. The control assembly as defined in claim 6 wherein said attachment means is mechanically interlocked with said fitting.

8. The control assembly as defined in claim 6 wherein said attachment means is molded to said fitting.

9. A flexible motion-transmitting control assembly comprising an axially extending flexible conduit including an inner tubular member of low friction organic polymeric material defining a bore of substantially uniform cross section throughout the length thereof, a plurality of axial load-bearing wires wrapped axially and helically about said inner tubular member on a long lead and being movable axially relative to each other and said inner tubular member as the latter is flexed, and a smooth tubular outer casing of organic polymeric material enclosing said wires and said inner tubular member, the ends of said wires projecting from between said inner tubular member and said casing at an end of said conduit and being bent radially outwardly from the axis of the latter; a flexible motion-transmitting wire core element supported within and extending through said bore for movement relative to said conduit, movement of said core element within said bore imposing axial loads on said wires; a fitting of organic polymeric material molded about said casing and said ends of said wires, said ends of said wires being embedded in said fitting to form a mechanical interlock therebetween to prevent relative axial movement between said fitting and said conduit as said core element is moved relative to the latter and to transmit axial loads imposed on said wires to said fitting, said fitting and mechanical interlock maintaining said conduit substantially free of radial forces which would radially deform said casing and the substantially uniform cross section of said bore and interfere with movement of said wires and said core element relative thereto; and attachment means carried by said fitting and attachable to a fixed support structure to secure said end of said conduit thereto while said core element is moved relative to said conduit.

References Cited by the Examiner
UNITED STATES PATENTS

| | | | |
|---|---|---|---|
| 1,649,139 | 11/1927 | Sonen | 285—291 X |
| 1,982,732 | 12/1934 | Fletcher et al. | 285—284 X |
| 2,046,545 | 7/1936 | Brickman et al. | 285—291 X |
| 2,370,884 | 3/1945 | Smith | 64—2 |
| 2,520,372 | 8/1950 | Phillips | 285—149 |
| 2,550,669 | 5/1951 | Brickman | 285—284 X |
| 2,667,369 | 1/1954 | Harper | 285—149 |
| 2,685,458 | 8/1954 | Shaw | 285—149 |
| 2,685,459 | 8/1954 | Panagrossi | 285—149 |
| 2,696,642 | 12/1954 | Kohrn | 264—275 |
| 2,735,699 | 2/1956 | Chadbourne | 285—61 X |
| 2,787,024 | 4/1957 | Smith | 264—275 |
| 2,787,917 | 4/1957 | Schroeder | 74—502 |
| 2,940,778 | 6/1960 | Kaiser | 285—149 X |
| 3,061,503 | 10/1962 | Gould et al. | 285—21 X |
| 3,063,303 | 11/1962 | Cadwallader | 138—122 X |
| 3,120,401 | 2/1964 | Brown | 285—284 X |
| 3,190,084 | 6/1965 | Moon et al. | 64—3 |

FOREIGN PATENTS

| | | |
|---|---|---|
| 511,989 | 8/1939 | Great Britain. |
| 829,179 | 2/1960 | Great Britain. |
| 856,040 | 12/1960 | Great Britain. |
| 920,448 | 3/1963 | Great Britain. |
| 505,986 | 12/1954 | Italy. |

MILTON KAUFMAN, *Primary Examiner.*

THOMAS F. CALLAGHAN, *Examiner.*

DALE A. THIEL, *Assistant Examiner.*